(12) United States Patent
Nakagawa

(10) Patent No.: US 9,227,468 B2
(45) Date of Patent: Jan. 5, 2016

(54) MOTORCYCLE TIRE

(75) Inventor: Mamoru Nakagawa, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 888 days.

(21) Appl. No.: 13/438,938

(22) Filed: Apr. 4, 2012

(65) Prior Publication Data
US 2012/0255660 A1 Oct. 11, 2012

(30) Foreign Application Priority Data
Apr. 5, 2011 (JP) ................. 2011-083859

(51) Int. Cl.
*B60C 11/117* (2006.01)
*B60C 11/03* (2006.01)
*B60C 11/13* (2006.01)

(52) U.S. Cl.
CPC .......... *B60C 11/0302* (2013.04); *B60C 11/1323* (2013.04); *B60C 2011/0374* (2013.04); *B60C 2200/10* (2013.04)

(58) Field of Classification Search
CPC ............. B60C 2200/10; B60C 11/0302; B60C 11/1323; B60C 11/032; B60C 11/1315; B60C 2011/0374; B60C 2011/0376; B60C 2011/0379; B60C 2011/0381
USPC ............. 152/209.11, 209.28, 209.24, 209.18; D12/535, 534, 563
IPC ...................................................... B60C 11/117
See application file for complete search history.

(56) References Cited

U.S. PATENT DOCUMENTS

D600,631 S * 9/2009 Kumamoto .................. D12/535

FOREIGN PATENT DOCUMENTS

JP 11-291716 A 10/1999
JP 2010285103 A * 12/2010 ............. B60C 11/04

OTHER PUBLICATIONS

Machine translation of JP2010-285103 (no date).*

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A motorcycle tire is provided in each half of the tread portion with main and auxiliary oblique grooves. The main oblique grooves on both sides of the tire equator are staggered and have axially inner ends at a first axial distance of 1 to 4 mm from the tire equator. The auxiliary oblique grooves have axially inner ends at a second axial distance more than the first axial distance. The main oblique groove comprises an axially inner part inclining at an angle of not more than 30 degrees and a middle part inclining at a larger angle of from 25 to 70 degrees. The auxiliary oblique groove comprises an axially inner part inclining at an angle of 25 to 55 degrees and a middle part inclining at a larger angle of from 45 to 75 degrees, each angle with respect to the tire circumferential direction.

9 Claims, 8 Drawing Sheets

MOTORCYCLE TIRE

BACKGROUND OF THE INVENTION

The present invention relates to a motorcycle tire, more particularly to a tread pattern capable of improving high-speed stability and noise performance without sacrificing handling stability and drainage.

In recent years, according to the developments of high-powered motorcycles and expressway network, street motorcycle tires are required to provide improved handling and stability of the motorcycle.

In Japanese Patent Application Publication No. 11-291716, a motorcycle tire (a) is disclosed wherein as shown in FIG. 8, the tread portion (b) is provided with a tread pattern comprising a circumferential groove (d) disposed on the tire equator (c) and oblique grooves (e) extending straight from a tread central region to tread shoulder regions so that the change in the tread pattern rigidity from the tread central region to the tread shoulder regions becomes smooth and thereby the handling and stability can be improved.

In such a tread pattern, however, the circumferential rigidity of the tread central region becomes insufficient for the recent high-powered motorcycles and it becomes difficult to provide excellent high-speed stability. Further, during touring on well-paved smooth road surfaces with less engine power, the tread pattern noise is felt as being relatively large.

SUMMARY OF THE INVENTION

It is therefore, an object of the present invention to provide a motorcycle tire, in which the high-speed stability and noise performance can be improved without sacrificing other performance such as handling stability and drainage.

According to the present invention, a motorcycle tire comprises a tread portion whose half region on each side of the tire equator is provided with main oblique grooves and auxiliary oblique grooves each not to protrude from the one half region to the other one half region, the main oblique grooves on both sides of the tire equator are arranged circumferentially of the tire in a staggered manner, each of the auxiliary oblique grooves is disposed between the circumferentially adjacent main oblique grooves so as to incline in the same direction as the main oblique grooves, the axially inner end of each of the main oblique grooves is positioned at a first axial distance of 1 to 4 mm from the tire equator, the axially inner end of each of the auxiliary oblique grooves is positioned at a second axial distance from the tire equator which is more than the first axial distance, each of the main oblique grooves comprises an axially inner part, a middle part and an axially outer part, wherein the axially inner part extends axially outwardly from the axially inner end of the main oblique groove, while inclining at an angle of not more than 30 degrees with respect to the tire circumferential direction, and the middle part is connected to the axially inner part through a curved part and extends at an angle with respect to the tire circumferential direction, which angle is more than the angle of the axially inner part and in a range of from 25 to 70 degrees, and each of the auxiliary oblique grooves comprises an axially inner part, a middle part and an axially outer part, wherein the axially inner part extends axially outwardly from the axially inner end of the auxiliary oblique grooves, while inclining at an angle of 25 to 55 degrees with respect to the tire circumferential direction, and the middle part is connected to the axially inner part through a curved part and extends at an angle with respect to the tire circumferential direction, which angle is more than the angle of the axially inner part and in a range of from 45 to 75 degrees.

Further, the motorcycle tire according to the present invention may be provided with the following optional features:

the axially inner end of the auxiliary oblique groove is positioned axially outside the curved part of the main oblique groove;

the angle of the inner part of the auxiliary oblique groove is more than the angle of the inner part of the main oblique groove;

the axial distance from the tire equator to the axially inner end of the curved part connecting between the axially inner part and the middle part of the auxiliary oblique groove is 30 to 55% of one half of the developed tread width;

the axially outer end of the main oblique groove and the axially outer end of the auxiliary oblique groove are positioned at the same axial distance from the tire equator; and the axially outer part of the main oblique groove inclines at an angle less than the angle of the middle part with respect to the tire circumferential direction, and the axially outer part of the auxiliary oblique groove inclines at an angle less than the angle of the middle part with respect to the tire circumferential direction.

Therefore, in the motorcycle tire according to the present invention, the tire equator is not crossed by any of the oblique grooves and there is no circumferential groove extending along the tire equator. Accordingly, the circumferential rigidity of the tread portion is increased in the vicinity of the tire equator, and the high-speed stability can be improved so as to satisfy the requirements of the high-powered motorcycles. Further, as the main and auxiliary oblique grooves are each inclined at at least two different angles, the change in the tread pattern rigidity from the axially inner end thereof towards the tread edge becomes smooth and thereby the handling stability can be improved. Furthermore, as the axially inner parts of the main and auxiliary oblique grooves are inclined at the relatively small angles with respect to the tire circumferential direction, the drainage or wet performance can be improved. Further, the curved part between the axially inner part and middle part can improve the noise performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

DESCRIPTION OF THE PREFERRED EMBODIMENTS

Embodiments of the present invention will now be described in detail in conjunction with the accompanying drawings.

Figure 1:
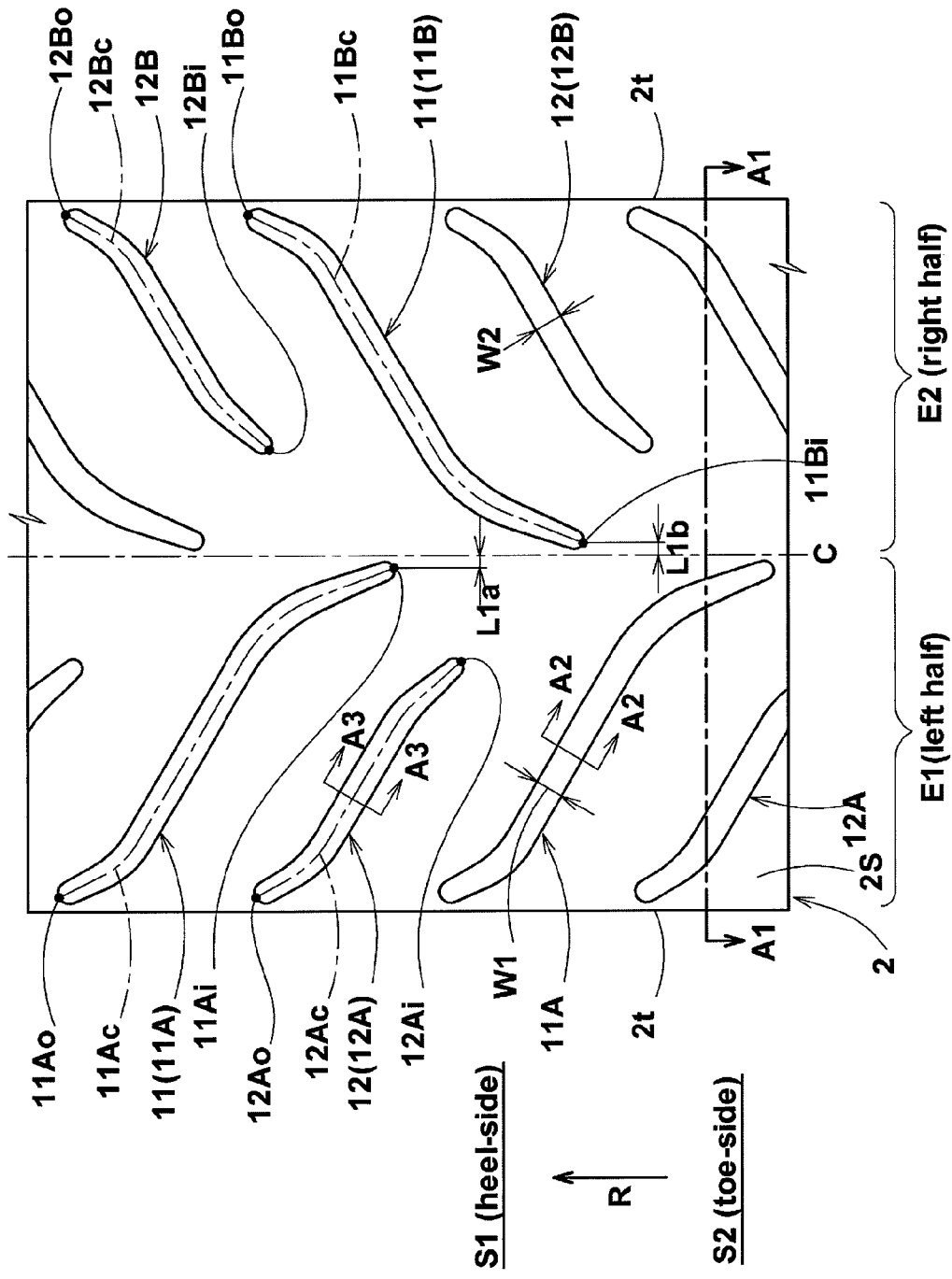
FIG. 1 is a developed partial view of the tread portion of a motorcycle tire according to the present invention.
Figure 2:
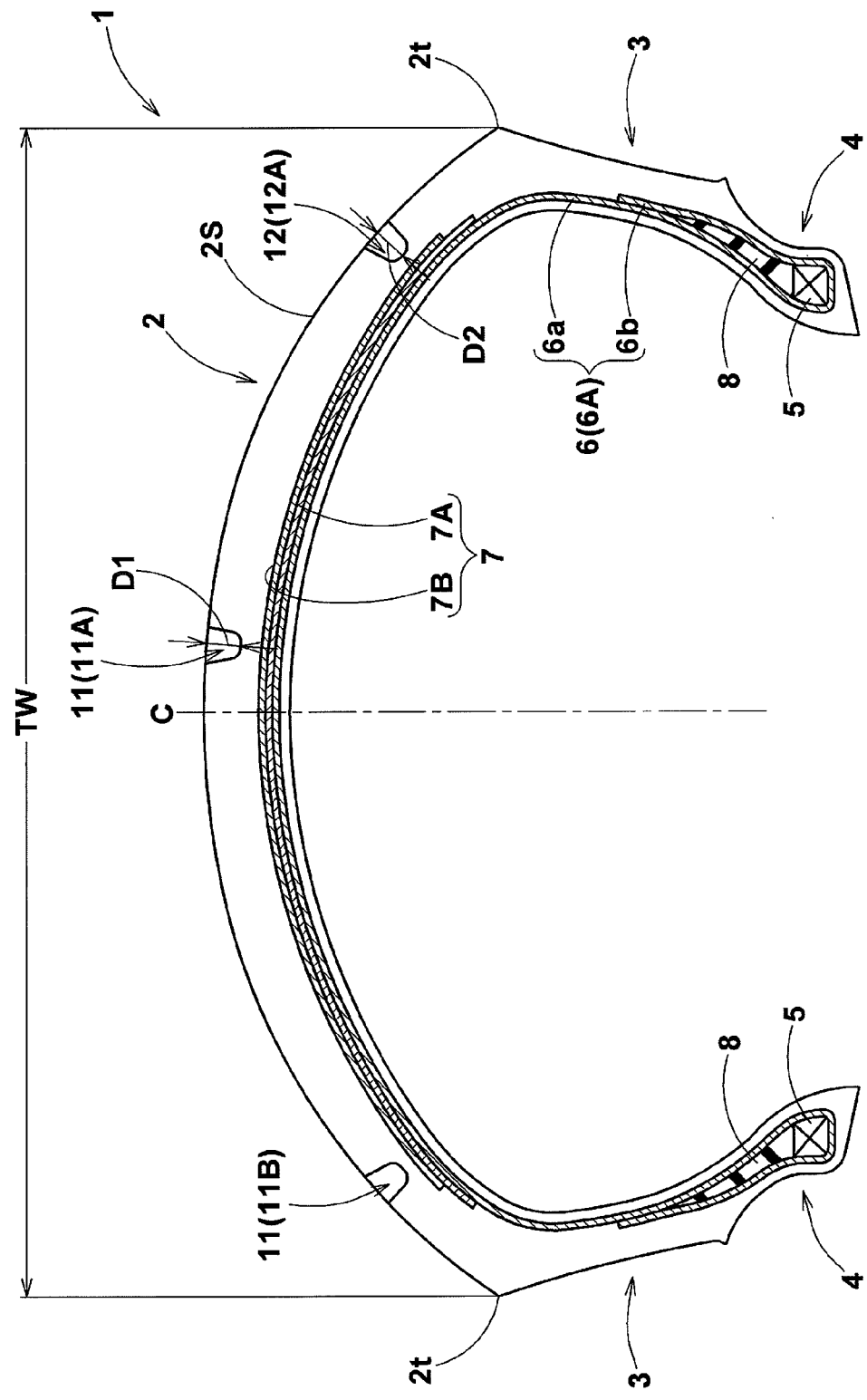
FIG. 2 is a cross sectional view of the motorcycle tire taken along line A1-A1 in FIG. 1.

According to the present invention, as shown in FIG. 1 and FIG. 2, a motorcycle tire 1 comprises a tread portion 2, a pair of axially spaced bead portions 4 each with a bead core 5 therein, a pair of sidewall portions 3 extending between the tread edges and the bead portions 4, a carcass 6 extending between the bead portions 4 through the tread portion 2 and sidewall portions 3, and a belt 7 disposed radially outside the carcass 6 in the tread portion 2.

The tread portion 2 is convexly curved so that the tread face 2S between the tread edges 2t is curved like an arc swelling radially outwardly as a characteristic of a motorcycle tire, and the maximum cross sectional width of the tire occurs between the tread edges 2t, namely, the maximum cross sectional width of the tire equals to the axial tread width TW.

The carcass 6 is composed of a single ply 6A of carcass cords arranged at an angle of from 75 to 90 degrees, preferably 80 to 90 degrees with respect to the tire equator C, and extending between the bead portions 4 through the tread portion 2 and sidewall portions 3, and further turned up around the bead core 5 in each of the bead portions 4 so as to form a pair of turned up portions 6b and a main portion 6a therebetween. For the carcass cords, organic fiber cords such as nylon, polyester and rayon can be used suitably.

The bead portions 4 are each provided between the carcass ply main portion 6a and turned up portion 6b with a bead apex 8 made of hard rubber extending radially outwardly in a tapered manner from the bead core.

The belt 7 is composed of at least one ply (in this example, two cross plies 7A and 7B) of belt cords laid at an angle of 5 to 40 degrees with respect to the tire equator. For the belt cords, steel cords, aramid cords, rayon cords or the like can be used suitably.

The tread portion 2 is provided with tread grooves defining a unidirectional tread pattern having an intended or designed rotational direction R.

As shown in FIG. 1, the tread grooves in this embodiment are main oblique grooves 11 and auxiliary oblique grooves 12. There is no groove other than the oblique grooves 11 and 12.

The main oblique grooves 11 are left-hand first main oblique grooves 11A disposed within a left half E1 of the tread portion 2 on the left side of the tire equator C, and right-hand second main oblique grooves 11B disposed within a right half E2 of the tread portion 2 on the right side of the tire equator C.

The left-hand main oblique grooves 11A and the right-hand main oblique grooves 11B are arraigned circumferentially of the tire in a staggered manner.

The configuration of the left-hand main oblique groove 11A and the configuration of the right-hand main oblique grooves 11B are symmetrical about the tire equator C.

Preferably, the main oblique groove 11 (11A, 11B) has a maximum groove width W1 of about 3.5 to 5.0 mm, and a maximum groove depth D1 of about 3.5 to 5.0 mm.

Figure 3A:
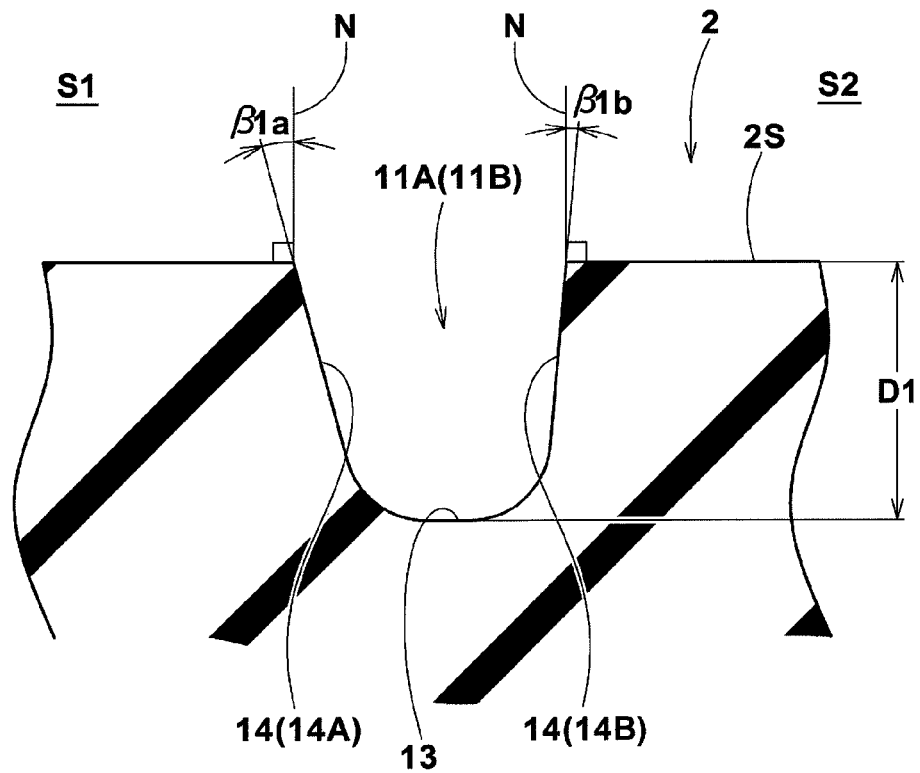
FIG. 3(a) is a cross sectional view taken along line A2-A2 in FIG. 1.

The main oblique groove 11 (11A, 11B) has a groove bottom 13 and a pair of groove sidewalls 14. As shown in FIG. 3(a), in a cross section perpendicular to the widthwise center line of the groove, the groove sidewalls 14 extend from the groove bottom 13 to the tread surface 2S, while inclining outwardly with respect to a normal line to the tread surface.

For the sake of convenience, one of the groove sidewalls 14 to be located on the heel-side S1 (or trailing edge side) in the intended tire rotational direction is called "heel-side groove sidewall 14A", and the other to be located on the toe-side S2 (or leading edge side) in the intended tire rotational direction is called "toe-side groove sidewall 14E".

In this embodiment, in the above-mentioned cross section, the angle $\beta 1a$ of the heel-side groove sidewall 14A with respect to a normal line to the tread surface is set to be more than the angle $\beta 1b$ of the toe-side groove sidewall 14B with respect to a normal line to the tread surface. Preferably, the angle $\beta 1a$ of the heel-side groove sidewall 14A is 5 to 30 degrees, and the angle $\beta 1b$ of the toe-side groove sidewall 14B is 0 to 5 degrees.

By configuring the main oblique grooves 11A and 11B in this way, it becomes possible to lessen the deformation (from the heel-side S1 toward the toe-side S2) of ground contacting tread elements formed between the main oblique grooves 11, and accordingly to increase the circumferential rigidity of such tread elements. Therefore, it becomes possible to improve the high-speed stability.

The axially inner end 11Ai of the left-hand main oblique groove 11A is positioned at an axial distance L1a of from 1 to 4 mm from the tire equator C not to extend beyond the tire equator C from E1 side to E2 side as shown in FIG. 1.

The axially inner end 11Bi of the right-hand main oblique groove 11B is positioned at an axial distance L1b of from 1 to 4 mm from the tire equator C not to extend beyond the tire equator C from E2 side to E1 side.

Preferably, the distances L1a and L1b are not less than 1.5 mm, and not more than 3.5 mm.

Such main oblique grooves 11A and 11B can maintain the circumferential rigidity of the tread portion 2 in the vicinity of the tire equator C, and thereby the high-speed stability can be improved.

If the distance (L1a, L1b) is less than 1 mm, then it becomes difficult to improve the high-speed stability. If the distance (L1a, L1b) is more than 4 mm, then the drainage is decreased near the tire equator C and there is a possibility that the wet performance during straight running deteriorates.

In this application, the axially inner end and the axially outer end of a groove or a part of a groove refer to those of the widthwise center line of the groove.

Figure 4:
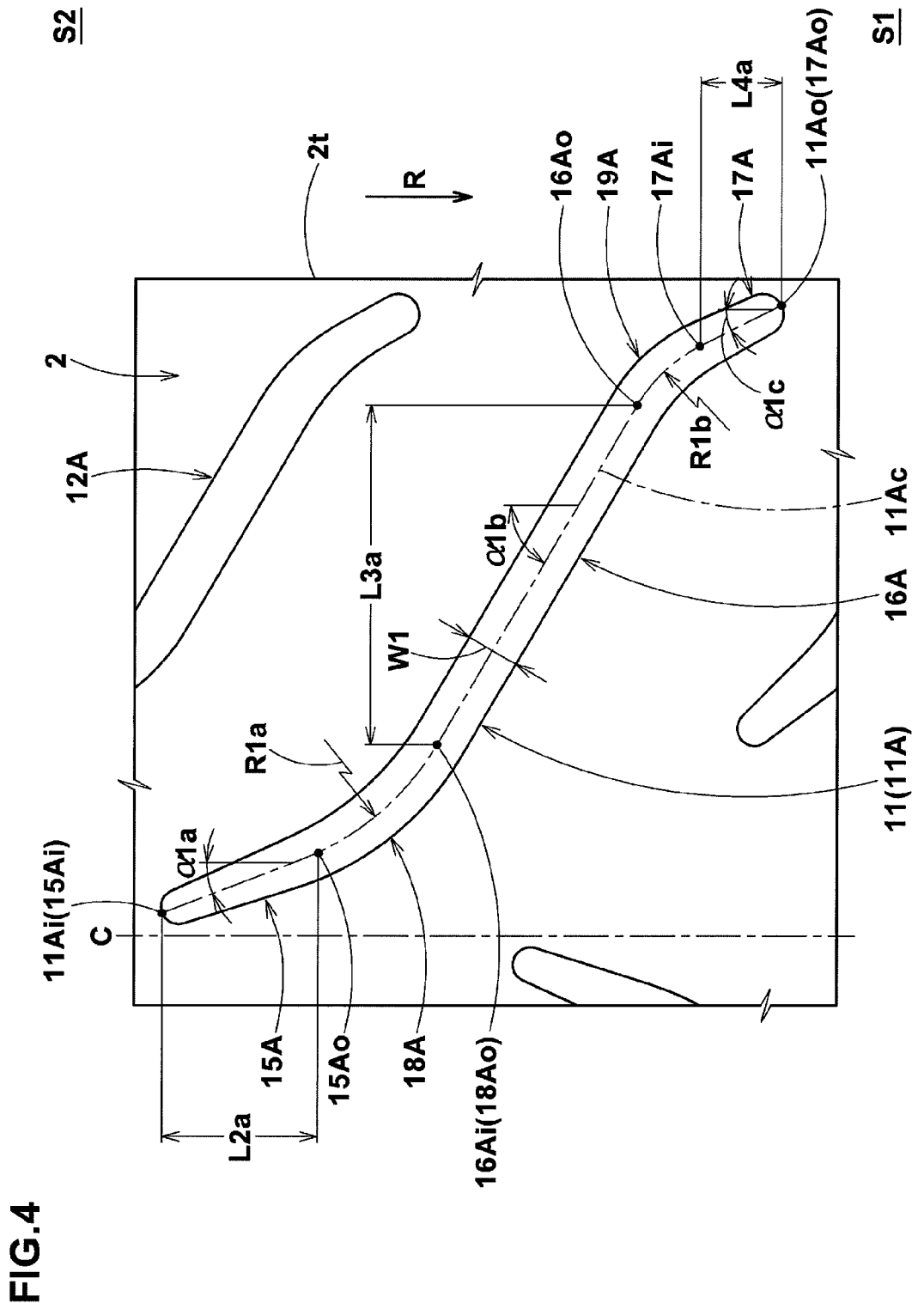
FIG. 4 is a top view of a left-hand main oblique groove.
Figure 5:
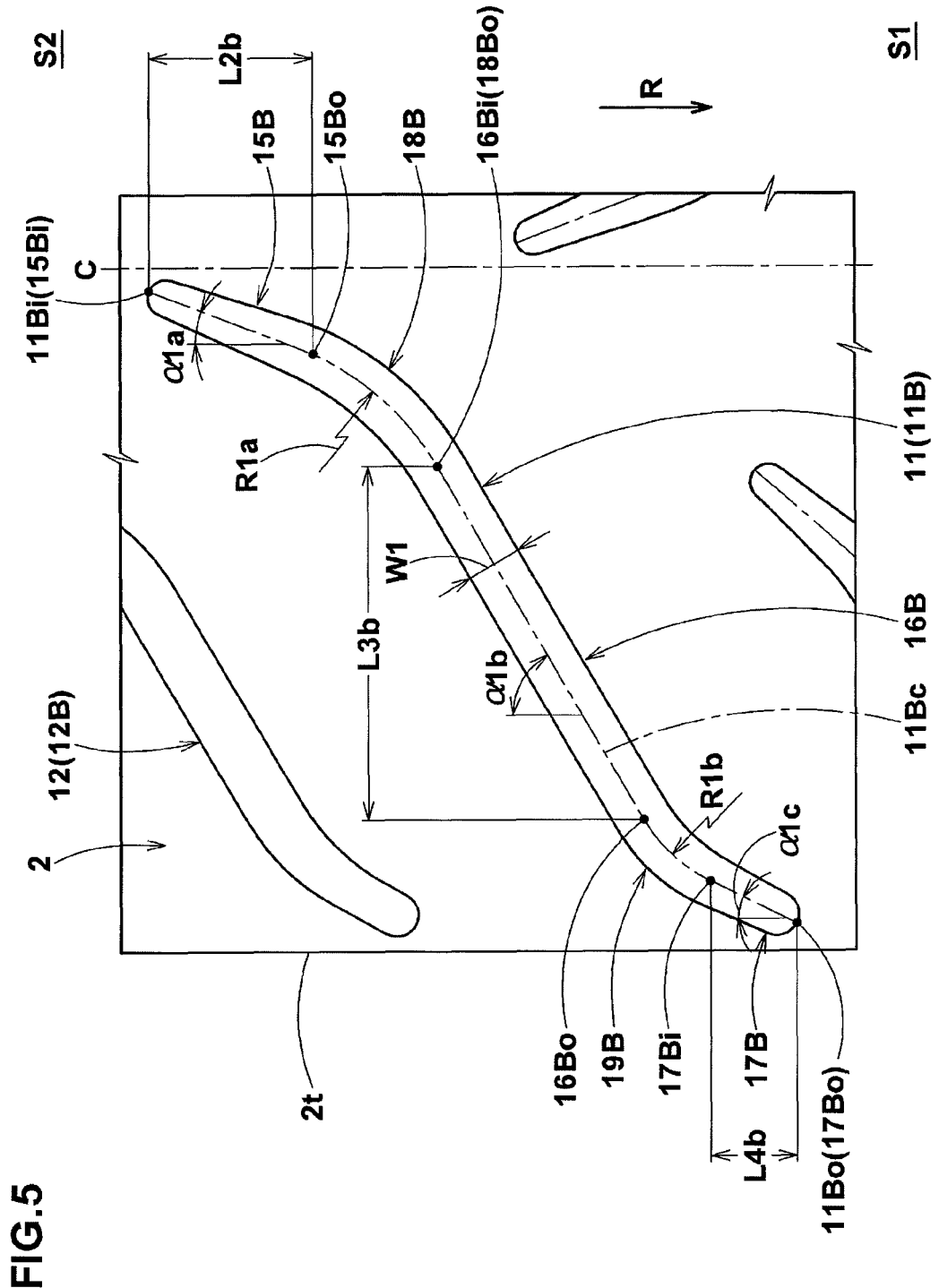
FIG. 5 is a top view of a right-hand main oblique groove.

As shown in FIG. 4 and FIG. 5, the main oblique groove 11 (11A, 11B) has a substantially s-shaped configuration and is made up of an axially inner part (15A, 15B) extending axially outwardly from the above-mentioned inner end (11Ai, 11Bi) and inclining at an angle $\alpha 1a$ of not more than 30 degrees with respect to the tire circumferential direction, a middle part (16A, 16B) connected to the axially inner part (15A, 15B) through an inside curved part ((18A, 18B)) and extending at an angle $\alpha 1b$ of from 25 to 70 degrees with respect to the tire circumferential direction which is more than angle $\alpha 1a$, and an axially outer part (17A, 17B) connected to the middle part (16A, 16B) through an outside curved part (19A, 19B) and extending at an angle $\alpha 1c$ of not more than 30 degrees with respect to the tire circumferential direction which is less than angle $\alpha 1b$.

Here, the angle ($\alpha 1a$, $\alpha 1b$ and $\alpha 1c$) means the angle of the widthwise center line (11Ac, 11Bc) of the main oblique groove (11A, 11B).

As the axially inner part (15A, 15B) extends at a relatively small angle $\alpha 1a$ near the tire equator, sufficient drainage is provided in the vicinity of the tire equator without forming a circumferential groove. Further, by the s-shaped configuration including the curved parts (18A, 18B, 19A, 19B), water existing in the tread center region is effectively led to the tread edges and discharged. Furthermore, the change in the tread pattern rigidity in the tire axial direction becomes smooth and the handling stability can be improved. Further, tread pattern noise can be improved.

The axially inner part (15A, 15B) extends straight from its axially inner end (15Ai, 15Bi) to outer end (15Ao, 15Bo), while inclining to the rotational direction R at the angle $\alpha 1a$ (<=30 degrees). Preferably, the angle $\alpha 1a$ is not more than 25 degrees and not less than 10 degrees.

Further, the groove width W1 of the axially inner part is gradually decreased from the outer end (15Ao, 15Bo) to the inner end (15Ai, 15Bi) not to decrease the rigidity in the vicinity of the tire equator C as far as possible and so that the change in the tread pattern rigidity form the tire equator C to the outer end (15Ao, 15Bo) becomes smooth and the handling stability can be improved. If the angle $\alpha 1a$ of the axially inner part (15A, 15B) is more than 30 degrees, it becomes difficult to obtain such advantageous effects.

The circumferential distance (L2a, L2b) between the axially inner end (15Ai, 15Bi) and outer end (15Ao, 15Bo) of the axially inner part (15A, 15B) is preferably not less than 15 mm, more preferably not less than 17 mm, but not more than 25 mm, more preferably not more than 23 mm.

The middle part (16A, 16B) extends straight from its axially inner end (16Ai, 16Bi) to outer end (16Ao, 16Bo), while inclining to the rotational direction R at the angle $\alpha 1b$ (25 to 70 degrees). Preferably, the angle $\alpha 1b$ is not less than 35 degrees and not more than 65 degrees.

If the angle $\alpha 1b$ of the middle part (16A, 16B) is less than 25 degrees, handling and stability during cornering are liable to deteriorate. If the angle $\alpha 1b$ is more than 70 degrees, the drainage performance is deteriorated and the tread pattern noise increases.

The axial distance (L3a, L3b) between the axially inner end (16Ai, 16Bi) and outer end (16Ao, 16Bo) of the middle part (16A, 16B) is preferably set in a range of not less than 50 mm, more preferably not less than 53 mm, but not more than 65 mm, more preferably not more than 62 mm.

The axially outer part (17A, 17B) extends straight from its axially inner end (17Ai, 17Bi) to outer end (17Ao, 17Bo), while inclining to the rotational direction R at the angle $\alpha 1c$ (not more than 30 degrees). Preferably, the angle $\alpha 1c$ not more than 25 degrees and not less than 10 degrees.

The groove width W1 of the axially outer part (17A, 17B) is gradually decreased from the inner end (17Ai, 17Bi) to the outer end (17Ao, 17Bo) not to decrease the tread pattern rigidity near the tread edge 2t and so that the handling stability can be improved.

As the axially outer parts (17A, 17B) extend at a relatively small angle $\alpha 1c$ near the tread edges 2t, it is possible to improve the drainage and pattern noise during cornering. If the angle $\alpha 1c$ of the axially outer part (17A, 17B) exceeds 30 degrees, it becomes difficult to obtain such advantageous effects.

The circumferential distance (L4a, L4b) between the inner end (17Ai, 17Bi) and outer end (17Ao, 17Bo) of the axially outer part (17A, 17B) is preferably set in a range of not less than 8 mm, more preferably not less than 10 mm, but not more than 16 mm, more preferably not more than 14 mm.

The inside curved part (18A, 18B) smoothly connects between the axially inner part (15A, 15B) and the middle part (16A, 16B), describing an arc convex toward the heel-side S1. Preferably, the radius of curvature R1a of the widthwise center line of the inside curved part (18A, 18B) is set in a range of not less than 15 mm, more preferably not less than 20 mm, but not more than 30 mm, more preferably not more than 25 mm in view of the drainage, pattern rigidity change, handling stability and noise performance.

The outside curved part (19A, 19B) smoothly connects between the middle part (16A, 16B) and the axially outer part (17A, 17B), describing an arc convex toward the toe-side S2. Preferably, the radius of curvature R1b of the widthwise center line of the outside curved part (19A, 19B) is set in a range of not less than 15 mm, more preferably not less than 20 mm, but not more than 30 mm, more preferably not more than 25 mm in view of the drainage, handling stability and noise performance.

The above-mentioned auxiliary oblique grooves 12 are left-hand auxiliary oblique grooves 12A arranged alternately with the left-hand main oblique grooves 11A, and right-hand auxiliary oblique grooves 12B arranged alternately with the right-hand main oblique grooves 11B.

The left-hand auxiliary oblique groove 12A has its axially inner end 12Ai and outer end 12Ao within the left half E1 of the tread portion 2 and is inclined to the same direction as the left-hand main oblique grooves 11A.

The right-hand auxiliary oblique groove 12B has its axially inner end 12Bi and outer end 12Bo within the right half E2 of the tread portion 2 and is inclined to the same direction as the right-hand main oblique grooves 11B.

Preferably, the auxiliary oblique groove 12 has a maximum groove width W2 of from about 3.5 to 5.0 mm, and a maximum groove depth D2 of from about 3.5 to 5.0 mm to enhance the drainage in cooperation with the main oblique grooves 11A and 11B.

Figure 3B:
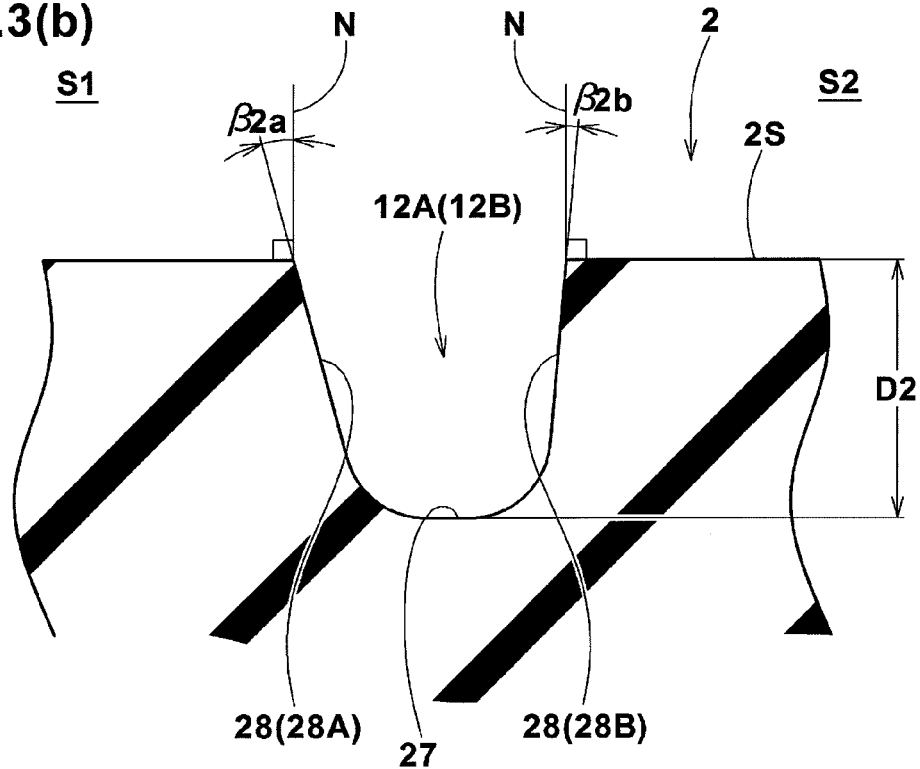
FIG. 3(b) is a cross sectional view taken along line A3-A3 in FIG. 1.

The auxiliary oblique groove (12A, 12B) has a groove bottom 27 and a pair of groove sidewalls 28. As show in FIG. 3(b), in a cross section perpendicular to the widthwise center line of the groove, the groove sidewalls 28 extend from the groove bottom 27 to the tread surface 2S, while inclining outwardly with respect to a normal line to the tread surface. For the sake of convenience, one of the groove sidewalls 28 to be located on the heel-side S1 in the intended tire rotational direction is called "heel-side groove sidewall 28A", and the other to be located on the toe-side S2 in the intended tire rotational direction is called "toe-side groove sidewall 28B".

In this embodiment, in the cross section perpendicular to the widthwise center line, the angle $\beta 2a$ of the heel-side groove sidewall 28A with respect to a normal line to the tread surface is set to be more than the angle $\beta 2b$ of the toe-side groove sidewall 28B with respect to a normal line to the tread surface. Preferably, the angle $\beta 2a$ of the heel-side groove sidewall 28A is set in a range of from 5 to 30 degrees, and the angle $\beta 2b$ of the toe-side groove sidewall 28B is set in a range of from 0 to 5 degrees.

By configuring the auxiliary oblique grooves 12A and 12B in this way, it becomes possible to lessen the deformation (from the heel-side S1 toward the toe-side S2) of ground contacting tread elements formed between the auxiliary oblique grooves and the main oblique grooves, and accordingly to increase the circumferential rigidity of such tread elements, therefore, it becomes possible to improve the high-speed stability.

On each side of the tire equator C, the axially inner end (12Ai, 12Bi) of the auxiliary oblique groove (12A, 12B) is positioned axially outside the inside curved part (18A, 18B) of the main oblique groove (11A, 11B).

Figure 6:
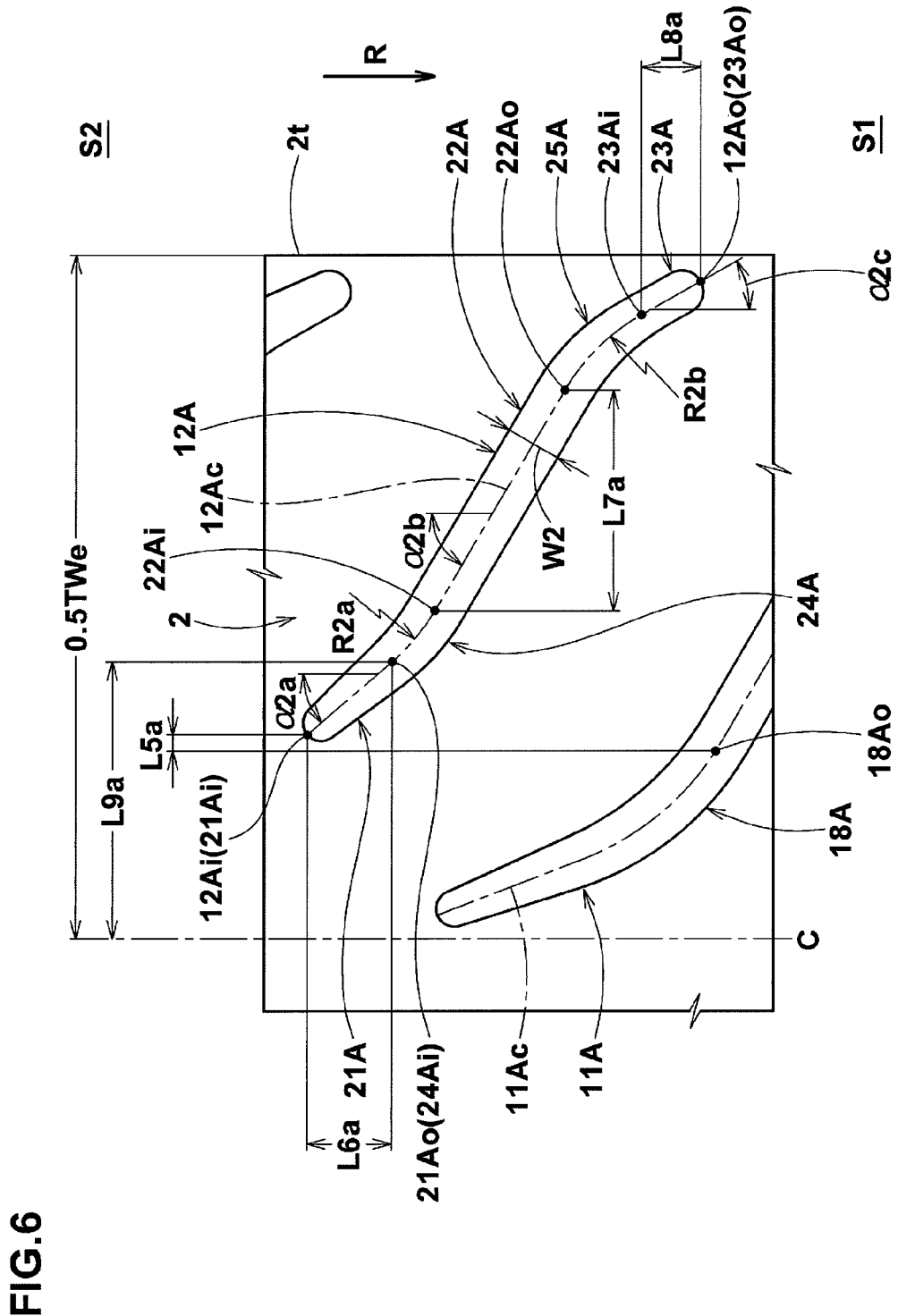
FIG. 6 is a top view of a left-hand auxiliary oblique groove.
Figure 7:
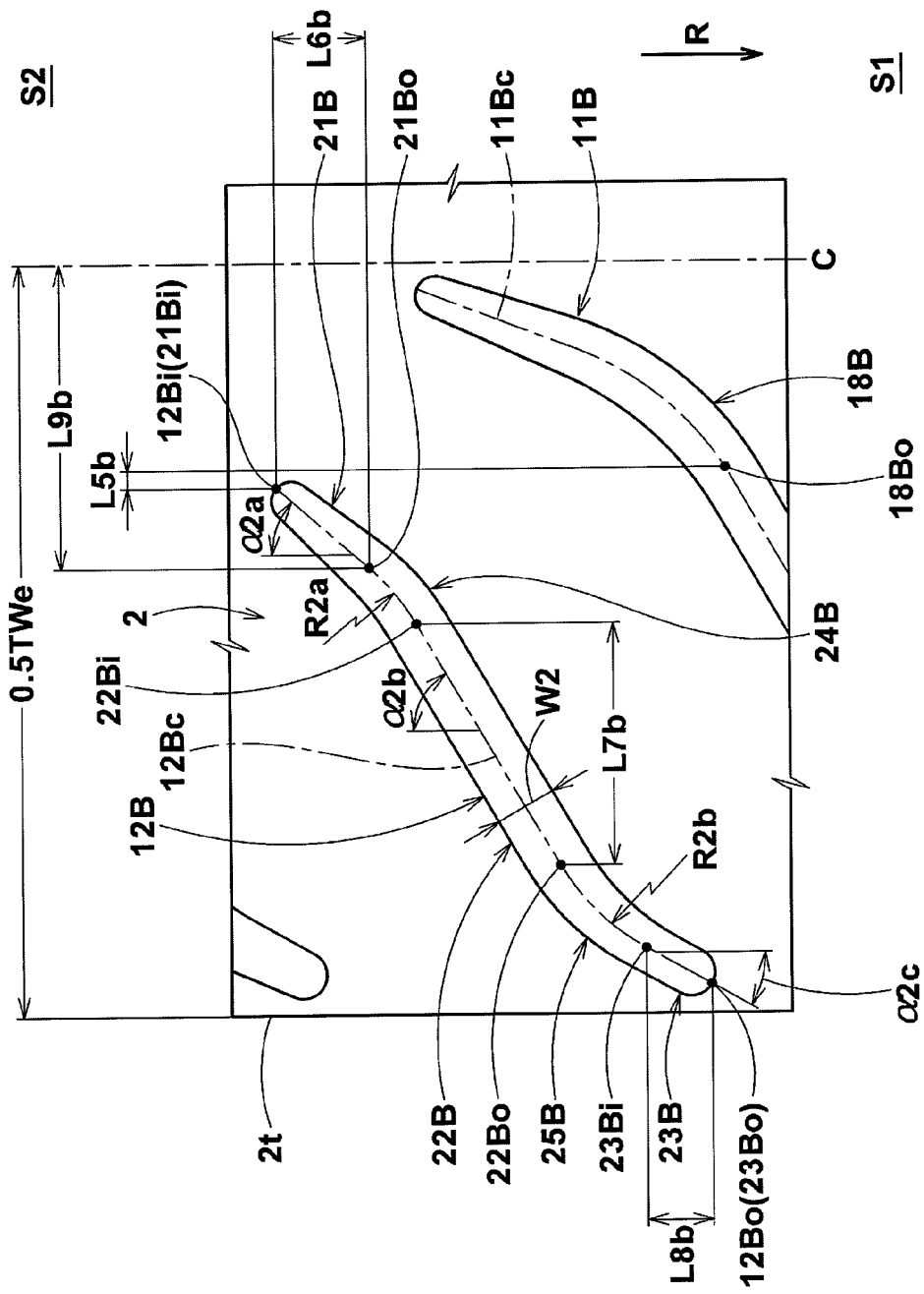
FIG. 7 is a top view of a right-hand auxiliary oblique groove.
Figure 8:
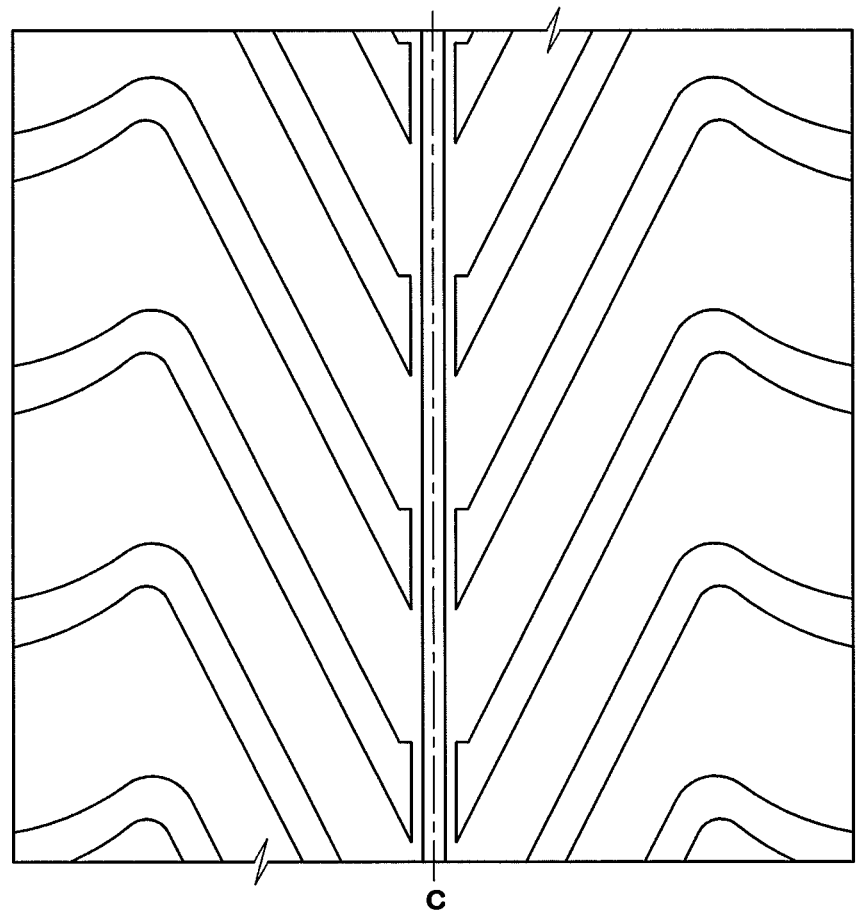
FIG. 8 shows a part of a tread pattern used in the undermentioned comparison test.

As shown in FIGS. 6 and 7, the axial distance (L5a, L5b) between the axially inner end (12Ai, 12Bi) and the inside curved part (18A, 18B) is preferably set in a range of not less than 4 mm, more preferably not less than 5 mm, but not more than 9 mm, more preferably not more than 8 mm.

If the distances L5a and L5b are more than 8 mm, there is a possibility that the drainage becomes insufficient. If the axial distances L5a and L5b are less than 4 mm, there is a possibility that the circumferential rigidity of the tread portion 2 near the tire equator C decreases and it becomes difficult to improve the high-speed stability.

Further, on each side of the tire equator C, the axially outer ends (12Ao, 12Bo) of the auxiliary oblique grooves (12A, 12B) are positioned at the same axial position as the axially outer ends (11Ao, 11Bo) of the main oblique grooves (11A, 11B) as shown in FIG. 1 in order to improve the drainage during cornering.

The auxiliary oblique groove (12A, 12B) has a substantially S-shaped configuration similar to that of the circumferentially adjacent main oblique groove (11A, 11B) and is made up of an axially inner part (21A, 21B) extending axially outwardly from the above-mentioned axially inner end (12Ai, 12Bi) at an angle $\alpha 2a$ of from 25 to 55 degrees with respect to the tire circumferential direction, a middle part (22A, 22B) connected to the axially inner part (21A, 21B) through an inside curved part (24A, 24B) and extending axially outwardly at an angle $\alpha 2b$ of from 45 to 75 degrees with respect to the tire circumferential direction which is more than the angle $\alpha 2a$, and an axially outer part (23A, 23B) connected to the middle part (22A, 22B) through an outside curved part (25A, 25B) and extending at an angle $\alpha 2c$ of not more than 30 degrees with respect to the tire circumferential direction which is less than the an angle $\alpha 2b$.

As shown in FIG. 6 and FIG. 7, the axially inner part (21A, 21B) extends straight from its axially inner end (21Ai, 21Bi) to outer end (21Ao, 21Bo), while inclining to the intended tire rotational direction R at the angle $\alpha 2a$ (25 to 55 degrees) more than the angle $\alpha 1a$ of the axially inner part (15A, 15B) of the main oblique groove (11A, 11B). Preferably, the angle $\alpha 2a$ is not more than 50 degrees and not less than 30 degrees.

The groove width W2 of the inner part (21A, 21B) is gradually decreased from the inner end (21Ai, 21Bi) to the outer end (21Ao, 21Bo).

By such s-shaped configuration, water existing in the tread middle region is effectively led to the tread edges and discharged. Furthermore, the change in the tread pattern rigidity in the tire axial direction becomes smooth and the handling stability can be improved. Further, tread pattern noise can be improved. These advantageous effects become difficult to obtain if the angle $\alpha 2a$ is more than 55 degrees. If the angle $\alpha 2a$ is less than 25 degrees, the handling stability is liable to deteriorate.

The circumferential distance (L6a, L6b) between the axially inner end (21Ai, 21Bi) and outer end (21Ao, 21Bo) of the axially inner part (21A, 21B) is preferably set in a range of not less than 8 mm, more preferably not less than 10 mm, but not more than 15 mm, more preferably not more than 13 mm.

The middle part (22A, 22B) extends straight from its axially inner end (22Ai, 22Bi) to outer end (22Ao, 22Bo), while inclining to the intended tire rotational direction R at the angle $\alpha 2b$ (45 to 75 degrees). Preferably, the angle $\alpha 2b$ is not less than 50 degrees and not more than 70 degrees to improve the handling and stability during cornering.

If the angle $\alpha 2b$ of the middle part (22A, 22B) is less than 45 degrees, the drainage performance and handling stability during cornering tend to deteriorate. If the angle $\alpha 2b$ exceeds 75 degrees, the noise performance and drainage performance tend to deteriorate.

The axial distance (L7a, L7b) between the axially inner end (22Ai, 22Bi) and outer end (22Ao, 22Bo) of the middle part (22A, 22B) is preferably set in a range of not less than 25 mm, more preferably not less than 27 mm, but not more than 35 mm, more preferably not more than 33 mm.

The axially outer part (23A, 23B) extends straight from its axially inner end (23Ai, 23Bi) to outer end (23Ao, 23Ao), while inclining to the intended tire rotational direction R at the angle $\alpha 2c$ (not more than 30 degrees). Preferably, the angle $\alpha 2c$ is not more than 25 degrees and not less than 10 degrees in order to enhance the drainage during cornering near the tread edge 2t.

The groove width W2 of the outer part (23A, 23B) is gradually decreased from the outer end (23Ao, 23Ao) to the inner end (23Ai, 23Bi) to minimize the decrease in the tread pattern rigidity near the tread edge 2t and so that the handling stability can be improved.

The circumferential distance (L8a, L8b) between the axially inner end (23Ai, 23Bi) and outer end (23Ao, 23Bo) of the axially outer part (23A, 23B) is preferably set in a range of not less than 8 mm, more preferably not less than 10 mm, but not more than 16 mm, more preferably not more than 14 mm.

The inside curved part (24A, 24B) smoothly connects between the axially inner part (21A, 21B) and the middle part (22A, 22B), describing an arc convex toward the heel-side S1. The radius of curvature R2a of the widthwise center line of the inside curved part (24A, 24B) is preferably set in a range of not less than 15 mm, more preferably not less than 20 mm, but not more than 50 mm, more preferably not more than 30 mm in view of the noise performance, drainage and handling stability.

The axial distance (L9a, L9b) between the axially inner end (24Ai, 24Bi) of the inside curved part (24A, 24B) and the tire equator C is set in a range of not less than 30%, preferably not less than 35% but not more than 55%, preferably not more than 45% of one half of the developed tread width measured axially between the tread edges 2t along the tread surface 25 in order to reduce the pattern noise during straight running.

If the distances L9a and L9b are less than 30% of a half developed tread width TWe, it is difficult to expect the reduction of the pattern noise during straight running. If the distances L9a and L9b are more than 50% a half developed tread width TWe, the tread pattern rigidity increases in the tread central region and middle region, ride comfort tends to deteriorate.

The outside curved part (25A, 25B) smoothly connects between the middle part (22A, 22B) and the axially outer part (23A, 23B), describing an arc convex toward the toe-side S2. The radius of curvature R2b of the widthwise center line of the outside curved part (25A, 25B) is preferably set in a range of not less than 15 mm, more preferably not less than 20 mm, but not more than 50 mm, more preferably not more than 30 mm in view of the noise performance, drainage and handling stability.

Comparison Tests

Test tires having the internal tire structure shown in FIG. 2 and main oblique grooves and auxiliary oblique grooves shown in Table 1 were prepared and tested.

Common Specifications are as Follows.
  Tire size: 90/90-21 M/C 54H (rim size: 21XMT2.15)
  Axial tread width TW: 91 mm
  Half developed tread width TWe: 52 mm
  main oblique grooves:
  maximum groove width W1: 5.0 mm
  maximum groove depth D1: 4.5 mm
  angle β1a of heel-side groove sidewall: 15 degrees
  angle β1b of toe-side groove sidewall: 5 degrees
  distance L2a, L2b between inner and outer ends of inner part: 13 mm
  distance L3a, L3b between inner and outer ends of middle part: 30 mm
  distance L4a, L4b between inner and outer ends of outer part: 11 mm
  Auxiliary oblique grooves:
  maximum groove width W2: 5.0 mm
  maximum groove depth D2: 4.5 mm
  angle β2a of heel-side groove sidewall: 15 degrees
  angle β2b of toe-side groove sidewall: 5 degrees
  distance L6a, L6b between inner and outer ends of inner part: 12.5 mm
  distance L7a, L7b between inner and outer ends of middle part: 22 mm
  distance L8a, L8b between inner and outer ends of outer part: 6 mm <Handling and High-Speed Stability Test>

The test tire was attached to a 1300 cc motorcycle. (tire pressure: 225 kPa)

During running on a dry asphalt road in a tire test circuit course, a test rider evaluated the handling response, rigid-feeling, road grip, and high-speed stability.

<Drainage Test>

Further, during running on the wet asphalt road in the tire test circuit course, the test rider evaluated the wet road grip performance.

<Noise Performance Test>

According to the "Test Procedure for Tire Noise" specified in Japanese JASO-C606, the motorcycle was coasted for 50 meter distance at a speed of 60 km/h on a dry asphalt road in a straight test course, and the maximum noise sound level was measured with a microphone set at 1.2 meter height from the road surface and 7.5 meter sideways from the running center line in the midpoint of the course.

The test results are indicated in Table 1 by an index based on comparative example tire Ref.1 being 100, wherein the larger the value, the better the performance.

From the test results, it was confirmed that the motorcycle tires according to the present invention can be improved in the high-speed stability and noise performance.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| tread pattern (FIG. no.) | 8 | 1 | 1 | 1 | 1 | 1 | 1 | 1 | 1 | 1 | 1 | 1 | 1 |
| main oblique grooves | | | | | | | | | | | | | |
| distance L1a, L1b(mm) | — | 0.0 | 2.5 | 1.0 | 4.0 | 2.5 | 2.5 | 2.5 | 2.5 | 2.5 | 2.5 | 2.5 | 2.5 |
| angle α1a (deg.) | — | 20 | 20 | 20 | 20 | 30 | 10 | 20 | 20 | 20 | 20 | 20 | 20 |
| angle α1b (deg.) | — | 60 | 60 | 60 | 60 | 70 | 25 | 60 | 60 | 60 | 60 | 60 | 60 |
| angle α1c (deg.) | — | 20 | 20 | 20 | 20 | 30 | 10 | 20 | 20 | 20 | 20 | 20 | 20 |
| radius R1a (mm) | — | 30 | 30 | 30 | 30 | 30 | 30 | 20 | 50 | 30 | 30 | 30 | 30 |
| radius R1b (mm) | — | 30 | 30 | 30 | 30 | 30 | 30 | 20 | 50 | 30 | 30 | 30 | 30 |
| auxiliary oblique grooves | | | | | | | | | | | | | |
| angle α2a (deg.) | — | 40 | 40 | 40 | 40 | 55 | 25 | 40 | 40 | 40 | 40 | 40 | 40 |
| angle α2b (deg.) | — | 60 | 60 | 60 | 60 | 75 | 45 | 60 | 60 | 60 | 60 | 60 | 60 |
| angle α2c (deg.) | — | 20 | 20 | 20 | 20 | 30 | 10 | 20 | 20 | 20 | 20 | 20 | 20 |
| radius R2a (mm) | — | 30 | 30 | 30 | 30 | 30 | 30 | 20 | 50 | 30 | 30 | 30 | 30 |
| radius R2b (mm) | — | 30 | 30 | 30 | 30 | 30 | 30 | 20 | 50 | 30 | 30 | 30 | 30 |
| distance L5a, L5b (mm) | — | 5 | 5 | 5 | 5 | 5 | 5 | 5 | 5 | 1 | 10 | 5 | 5 |
| distance L9a, L9b (mm) | — | 16 | 16 | 16 | 16 | 16 | 16 | 16 | 16 | 16 | 16 | 15.6 | 26 |
| (L9a, L9b)/TWe (%) *1 | — | 31 | 31 | 31 | 31 | 31 | 31 | 31 | 31 | 31 | 31 | 30 | 50 |
| handling stability | 100 | 110 | 110 | 110 | 110 | 105 | 90 | 105 | 110 | 110 | 110 | 110 | 105 |
| high-speed stability | 100 | 90 | 110 | 98 | 115 | 110 | 110 | 110 | 110 | 100 | 110 | 100 | 110 |
| drainage | 100 | 110 | 110 | 110 | 100 | 105 | 115 | 105 | 110 | 110 | 100 | 115 | 98 |
| noise performance | 100 | 110 | 110 | 110 | 110 | 110 | 110 | 110 | 100 | 110 | 110 | 100 | 110 |

*1 TWe: one half of the developed tread width (=52 mm)

The invention claimed is:

1. A motorcycle tire comprising
   a tread portion whose half region on each side of the tire equator is provided with main oblique grooves and auxiliary oblique grooves each not to protrude from the one half region to the other one half region,
   wherein
   the main oblique grooves on both sides of the tire equator are arranged circumferentially of the tire in a staggered manner,
   each of the auxiliary oblique grooves is disposed between the circumferentially adjacent main oblique grooves so as to incline in the same direction as the main oblique grooves,
   the axially inner end of each of the main oblique grooves is positioned at a first axial distance of 1 to 4 mm from the tire equator,
   the axially inner end of each of the auxiliary oblique grooves is positioned at a second axial distance from the tire equator which is more than the first axial distance,
   each of the main oblique grooves is composed of an axially inner linear part, an axially inner curved part, a middle linear part, an axially outer curved part, and an axially outer linear part, wherein the axially inner linear part extends substantially straight, axially outwardly from the axially inner end of the main oblique groove, while inclining at an angle of not more than 30 degrees with respect to the tire circumferential direction, the middle linear part is connected to the axially inner linear part through the axially inner curved part and extends substantially straight at an angle with respect to the tire circumferential direction, which angle is more than the angle of the axially inner linear part and in a range of from 25 to 70 degrees, and the axially outer linear part is connected to the middle linear part through the axially outer curved part and extends substantially straight at an angle with respect to the tire circumferential direction, which angle is less than the angle of the middle linear part and not more than 30 degrees, and each of the auxiliary oblique grooves is composed of an axially inner linear part, an axially inner curved part, a middle linear part, an axially outer curved part, and an axially outer linear part, wherein the axially inner linear part extends substantially straight, axially outwardly from the axially inner end of the auxiliary oblique grooves, while inclining at an angle of 25 to 55 degrees with respect to the tire circumferential direction, and the middle linear part is connected to the axially inner linear part through the axially inner curved part and extends substantially straight at an angle with respect to the tire circumferential direction, which angle is more than the angle of the axially inner linear part and in a range of from 45 to 75 degrees, and the axially outer linear part is connected to the middle linear part through the axially outer curved part and extends substantially straight at an angle with respect to the tire circumferential direction, which angle is less than the angle of the middle linear part and not more than 30 degrees.

2. The motorcycle tire according to claim 1, wherein the axially inner end of the auxiliary oblique groove is positioned axially outside said axially inner curved part of the main oblique groove.

3. The motorcycle tire according to claim 1 or 2, wherein the angle of the axially inner linear part of the auxiliary oblique groove is more than the angle of the axially inner linear part of the main oblique groove.

4. The motorcycle tire according to claim 1, wherein the axial distance from the tire equator to the axially inner end of the axially inner curved part of the auxiliary oblique groove is 30 to 55% of one half of the developed tread width.

5. The motorcycle tire according to claim 1, wherein the axially outer end of the main oblique groove and the axially outer end of the auxiliary oblique groove are positioned at the same axial distance from the tire equator.

6. The motorcycle tire according to claim 1, wherein in each main oblique groove,
    an axial distance between the axially inner end and outer end of the middle linear part is not less than 50 mm and not more than 65 mm, and
    a circumferential distance between the axially inner end and outer end of the axially outer linear part is not less than 8 mm and not more than 16 mm, and
    an axial distance from the axially inner end of the auxiliary oblique groove to the axially inner curved part of the main oblique groove is not less than 4 mm and not more than 9 mm.

7. The motorcycle tire according to claim 6, wherein in each main oblique groove,
    a radius of curvature of the widthwise center line of the axially inner curved part is not less than 15 mm and not more than 30 mm, and
    a radius of curvature of the widthwise center line of the axially outer curved part is not less than 15 mm and not more than 30 mm.

8. The motorcycle tire according to claim 1, wherein in each auxiliary oblique groove,
    a circumferential distance between the axially inner end and outer end of the axially inner linear part is not less than 8 mm and not more than 15 mm, and
    an axial distance between the axially inner end and outer end of the middle linear part is not less than 25 mm and not more than 35 mm, and
    a circumferential distance between the axially inner end and outer end of the axially outer linear part is not less than 8 mm and not more than 16 mm.

9. The motorcycle tire according to claim 8, wherein in each auxiliary oblique groove,
    a radius of curvature of the widthwise center line of the axially inner curved part is not less than 15 mm and not more than 50 mm, and
    a radius of curvature of the widthwise center line of the axially outer curved part is not less than 15 mm and not more than 50 mm.

* * * * *